J. J. VOORHEES.
MATERIAL FOR PRODUCING PATCHES FOR PNEUMATIC TIRES AND THE LIKE.
APPLICATION FILED JULY 11, 1919.
1,385,805.
Patented July 26, 1921.
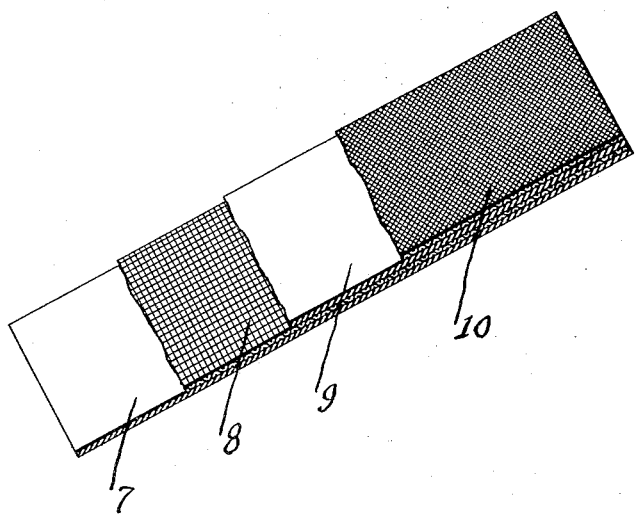
INVENTOR
JOHN J. VOORHEES
BY
ATTORNEYS

UNITED STATES PATENT OFFICE.

JOHN J. VOORHEES, OF JERSEY CITY, NEW JERSEY.

MATERIAL FOR PRODUCING PATCHES FOR PNEUMATIC TIRES AND THE LIKE.

1,385,805.            Specification of Letters Patent.     Patented July 26, 1921.

Application filed July 11, 1919. Serial No. 310,041.

*To all whom it may concern:*

Be it known that I, JOHN J. VOORHEES, a citizen of the United States, residing at Jersey City, in the county of Hudson and State of New Jersey, have invented certain new and useful Improvements in Materials for Producing Patches for Pneumatic Tires and the like, of which the following is a full, clear, and concise description.

The present invention relates generally to means for effecting the repair of pneumatic tires, tubes, air cushions and the like, and is more especially directed to the production of a material from which so-called repair patches may be made or formed.

Heretofore it has been customary to repair punctured or torn tubes or the like with patches in the form of rubber disks, or by making or cutting a patch of the desired size from a non-elastic material, usually produced in sheet form. The former type of patches are expensive to produce, and their range of usefulness is limited by reason of the fact that they are only serviceable in the treatment of comparatively small punctures or cuts.

The non-elastic material, from which patches are made, has also been found unsatisfactory owing to the fact that the material embodies a substantially non-stretchable fabric, so that when the patch has been applied to an inner tube for a pneumatic tire and the tube inflated, the patch material will not stretch with the wall of the tube. This results in the portions of the tube adjacent to the puncture or tear gradually pulling or creeping away from the patch material, the latter of which, by reason of this gradual movement of the tube, becomes loosened therefrom and has a tendency to curl up adjacent to its edges. The non-stretchability of the patch material, it will be seen, therefore, is a decided disadvantage where it is desired to effect a permanent repair in an expeditious manner, which is the object of the so-called repair patches.

Furthermore, in the repair patch material just referred to, the fabric employed is of a comparatively heavy stock, so that the material is more or less difficult to handle with the facilities at one's disposal when making what is known as a roadside repair of an inner tube for pneumatic vehicle tires.

Other disadvantages, such as the cost of manufacture, reside in the use of the patch material described.

From the foregoing, it will be manifest that a material for effecting the repair of pneumatic tires, tubes and the like, in order to obtain permanent results in a simple and expeditious manner, must possess characteristics which will more nearly approximate the material of which the tires and tubes are composed, and must be more economical to produce than those forms of repair patch materials now known.

The primary object of the present invention is to provide a material which may be made up in sheet form, from which repair patches may be cut or shaped and applied to the damaged tire or tube in a simple and expeditious manner.

A further object of this invention is to provide an elastic or stretchable material from which repair patches for tires, tubes and the like, may be formed, and which, when applied to the damaged tire or tube, will embody substantially the same characteristics as the tire or tube material, so that in effect the repair patch will become substantially an integral part of the tire or tube, whereby a durable and permanent repair is obtained.

This invention further contemplates the provision of a material possessing the aforesaid advantages and characteristics which may be produced in sheet form in a simple and economical manner, and which embodies rubber and an elastic fabric in its construction so united as to be inseparable, the patches cut or made therefrom being capable of conforming to the contour of the tire or tube to which they are applied.

This invention also comprehends a repair patch material formed of vulcanized rubber and an elastic fabric and green or live rubber inseparably united, a patch made therefrom being capable of stretching or expanding with the wall of the tire or tube to which it is affixed by the simple expedient of applying a prepared cement or liquid rubber to the wall of the tire or tube and pressing the green or live rubber of the patch material into contact therewith.

Further objects and advantages of this invention will become apparent as the description proceeds, and I will have it understood that I reserve unto myself all rights to the full range of equivalents both in structure and uses to which I may be entitled under my invention in its broadest aspect.

I shall now proceed to describe my invention with reference to the embodiment shown in the accompanying drawing, and then point out with more particularity the essential elements of novelty in the appended claims.

Referring now to the drawing, in detail, wherein I have illustrated a section of the repair patch material, made in accordance with my invention, 7 indicates the outside or top layer of vulcanized rubber. The repair patch material is preferably produced in sheet form of various marketable sizes, and in the production of the material, I apply to the surface of the vulcanized rubber 7 a fabric 8, the size of which is coextensive with that of the rubber 7, the fabric and rubber being united so as to be come inseparable by any suitable method, preferably vulcanization.

In order to obtain the elasticity which is necessary in a repair patch material of this kind, as heretofore pointed out, the fabric 8 must necessarily be elastic or stretchable in all directions, so that it will not prevent the expansion or yielding of the rubber forming a part of the material when applied to a tire or shoe, but, when expanded or stretched therewith, will reinforce the rubber, so that a patch made from any material will possess all the advantages of a patch made wholly from rubber with the addition of the strength and durability which is naturally imparted to it by the fabric.

I have found stockinet to be a fabric which admirably suits the requirements of my invention, owing to its strength and elasticity combined with its light weight and the economy of its production. I would have it understood, of course, that I do not limit myself to the particular class of fabric described, but merely cite it as an example of a fabric which possesses the characteristics desirable or necessary to produce my repair patch material, so that it will perform its functions in the most efficient manner.

Applied to the upper surface of the fabric 8 of my repair patch material is a layer of adhesive green or unvulcanized rubber, as shown at 9, permanently united to the fabric, the exposed surface of the said green rubber being protected by a thin sheet of preferably glazed fabric 10 which is held in place by the adhesive qualities of the rubber 9 and may be readily stripped or pulled from its protecting position so as to expose the surface of the green rubber when it is desired to apply my material to a tube or tire to effect a repair.

Assuming that a damaged tube for pneumatic tires is to be repaired, the portions of the outer surface or wall of the tube adjacent to the tear or puncture are cleaned with gasolene or any suitable agent. When the cleaning agent has evaporated, or the surface or wall of the tube has become dry, it is then coated with a rubber cement, and a patch of the desired size cut from the material made in accordance with my invention.

When the patch has been cut, the protecting fabric 10 may be stripped therefrom, whereupon the exposed surface of the green or unvulcanized rubber 9 of the patch is applied to the outer surface or wall of the tube and pressed firmly into contact therewith. The tube may then be inserted in the tire or shoe and inflated in the usual manner, the patch material becoming substantially an integral part of the tube wall and stretching therewith, the elasticity of the patch material having a tendency to cause the edges of the patch to turn downwardly in close adherence with the surface of the tube, rather than to curl up or pull away therefrom, as is the case where patch material having a non-stretchable or substantially non-stretchable fabric is employed.

While I have described a preferred embodiment of my invention, it is obvious that various changes may be made in the method of uniting the different components of the patch material, and that the characteristics of the components may vary without departing from the spirit and scope of my invention, which is broadly directed to a repair patch material made up in sheet form, whereby the patch which is produced therefrom will possess sufficient elasticity in all directions to stretch with the tire or tube to which the patch is applied, and will adhere thereto with a degree of permanence which has not hitherto been obtainable.

I claim:

1. A material for the production of patches for repairing pneumatic tires and the like, consisting of a layer of vulcanized rubber, a layer of elastic fabric vulcanized thereto, and a layer of unvulcanized rubber permanently united to the fabric, said material being stretchable longitudinally and transversely.

2. A material for the production of repair patches for pneumatic tires and the like, composed of vulcanized rubber, unvulcanized rubber and a reinforcing material united thereto, said reinforcing material being capable of stretching with the rubber in all directions.

3. A material in sheet form from which patches for pneumatic tires may be cut, composed of vulcanized rubber, stockinet, a layer of unvulcanized rubber permanently united to said stockinet, and a protecting fabric superposed on said layer of unvulcanized rubber, said protecting fabric being adapted to be stripped from said unvulcanized rubber for the purposes described.

4. A material for the production of patches for repairing pneumatic tires and the like consisting of a layer of vulcanized rubber, a loosely woven fabric vulcanized thereto, a layer of unvulcanized rubber permanently united to said fabric, and a non-stretchable fabric removably superposed upon said layer of unvulcanized rubber, said material being stretchable in all directions upon the removal of said non-stretchable fabric.

JNO. J. VOORHEES.